No. 690,449. Patented Jan. 7, 1902.
J. A. MARTIN.
TRUCK.
(Application filed June 10, 1901.)
(No Model.)
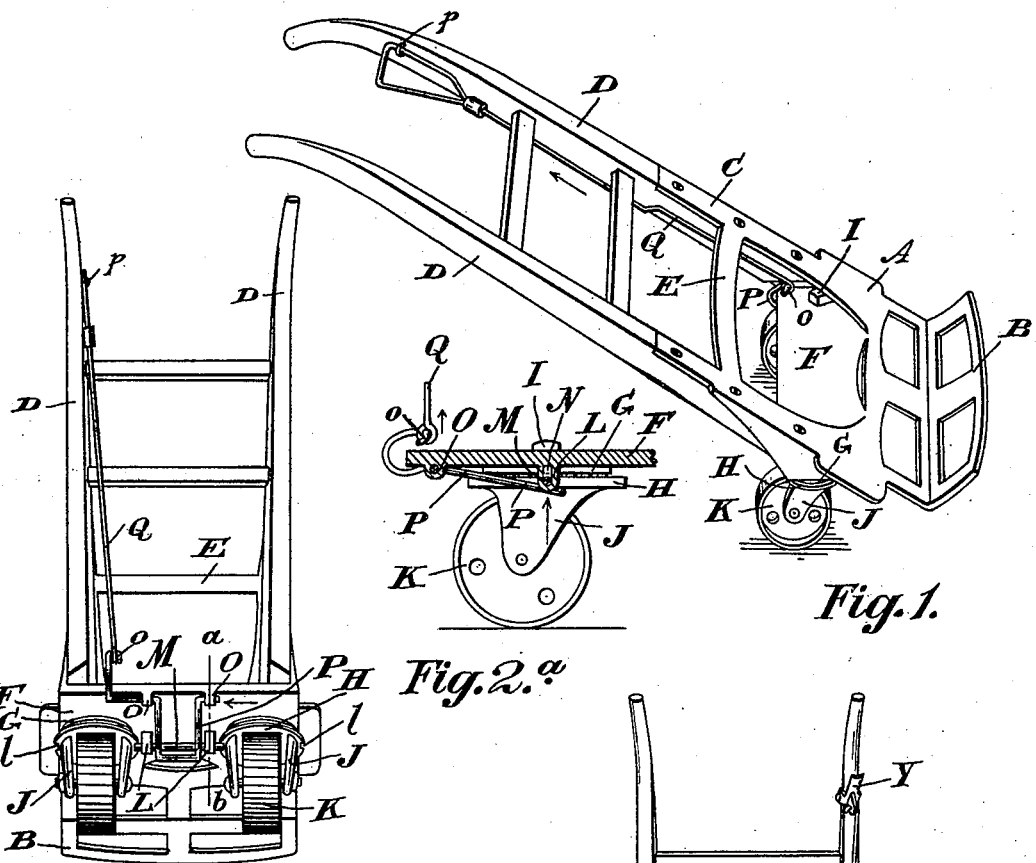
Fig. 1.
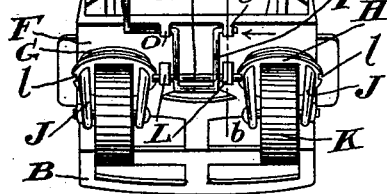
Fig. 2.
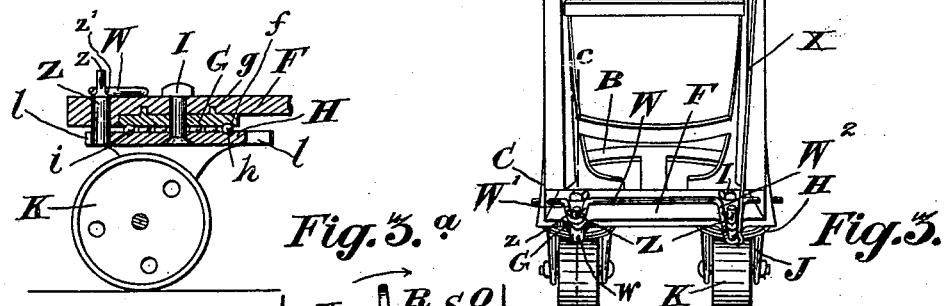
Fig. 3.
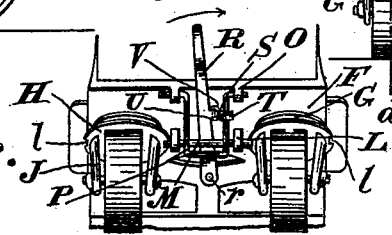
Fig. 2.ᵇ
Witnesses.
Inventor:
J. A. Martin

UNITED STATES PATENT OFFICE.

JOHN ARTHUR MARTIN, OF TORONTO, CANADA.

TRUCK.

SPECIFICATION forming part of Letters Patent No. 690,449, dated January 7, 1902.

Application filed June 10, 1901. Serial No. 64,006. (No model.)

*To all whom it may concern:*

Be it known that I, JOHN ARTHUR MARTIN, laborer, a subject of the King of Great Britain, residing at Toronto, in the county of York, in the Province of Ontario, Canada, have invented certain new and useful Improvements in Trucks, of which the following is a specification.

My invention relates to improvements in trucks; and the object of my invention is more particularly to provide a two-wheeled truck with casters, preferably ball-bearing ones, and, further, to provide means for locking said casters, so as to prevent the same from turning; and it consists, essentially, in placing and holding a bolt or pin in such convenient position that the same will engage with the revoluble portion of the casters and lock same or be brought out of contact with the revoluble portion of said casters, so as to permit turning of same, and, further, in providing means for operating said bolt or pin, as hereinafter more particularly explained.

By means of providing a truck with casters I find that I can very easily handle very heavy weights within a much smaller space of time than is possible with the ordinary truck which has the usual wheels held in stiff bearing. I provide my truck with means for locking the casters of same, so that when said truck is used on a gangway, for instance, its casters can be locked, and thus really convert the truck into an ordinary truck such as is now on the market.

Figure 1 is a general front perspective view of my truck. Fig. 2 is a rear perspective view of my truck. Fig. $2^a$ is a section on the line $a$ $b$, Fig. 2, looking in the direction indicated by arrow. Fig. $2^b$ is a perspective view of my truck with parts removed, showing an alternative form of means for operating the locking mechanism. Fig. 3 is a perspective view of my truck provided with an alternative form of means for locking the casters of same. Fig. $3^a$ is a section on the line $c$ $d$, Fig. 3.

In the drawings like letters of reference indicate corresponding parts in each figure.

A is the base-plate, which is provided with the usual lip B.

C represents extensions of the base-plate A, to which the handles D of the truck are suitably secured. Extensions C are suitably braced together by means of a cross-piece E. The said base-plate A and its several parts are of course preferably cast or forged in one piece.

F is a shelf which forms part of the base-plate A. While the truck is in use the shelf F is designed to be horizontal with the floor.

Although I preferably use ball-bearing casters in constructing my truck I lay claim to use any kind of caster. The casters I preferably use in connection with my truck are ball-bearing ones and are constructed as follows:

G is the upper plate of the caster, which may be secured to or form part of the shelf F. In the present case I provide the said plate G with pins $g$, which fit into corresponding recesses in the under side of the shelf F. This will prevent the rotation of said plates G. $f$ is a ball-race formed in the under side of the said plates G. H is the bottom plate of the caster, which is also provided with a ball-race $h$ on its upper side. The bottom plates H are considerably wider than the upper plates G, as will be seen clearly on reference to Figs. $2^a$ and $3^a$. $i$ represents the balls resting in the said races.

I is a king-bolt which passes through the lower plate H and upper plate G, securing same to the shelf F.

Journaled in the side arms J and secured to and forming part of the under side of plate H is a caster-wheel K. The bearing of the said caster-wheels is, as will be seen on reference to Figs. $2^a$ and $3^a$, to one side of the pivotal point or king-bolt I, by which the casters are secured to the shelf F. It will of course be understood that the plate H is the one that rotates.

Held in suitable brackets L, which are secured to or form part of the under side of the shelf F, is a bolt or pin M, which engages in the end slots $l$ in the plates H, (see Fig. 2,) thus locking the casters. As before explained, the said casters will only be locked when in the position shown clearly in Fig. 2. The bolt or pin M has a vertical movement by means of the longitudinal slot N in the brackets L, so that in case one end of the bolt is locking one of the casters the other end of the bolt will ride on top of the plate H until said plate comes into such position that this end of said bolt can drop into the slot $l$ of same and lock same, so that by means of the vertical play allowed said bolt it will not be necessary for the slots $l$ in the respective casters to be in alinement before said casters are locked. The ends of the bolt or pin M approximately abut the sides of the upper plate G, and thus prevent said pin from moving out of its brackets.

Having bearing in the brackets O, secured to and forming part of the under side of the shelf F, is an arm P, which extends underneath the bolt or pin M, as shown in Figs. 2, $2^a$, and $2^b$.

Q is a rod secured at one end $o$ to the arm P and near the upper end of one of the handles of the truck and preferably on the inner side thereof by means of staple $p$ or similar device. When the rod Q is pulled in the direction indicated by arrow, the arm P is moved upwardly in the direction indicated by arrow in Fig. $2^a$, thus moving the bolt or pin M out of engagement with the slot $l$ in the plates H, thus unlocking the caster and permitting same to revolve. When it is desired to again lock the casters, the rod Q is released and is drawn by gravity back into the position shown in Figs. 2, $2^a$, and $2^b$, thus permitting the bolt or pin M when its ends register with the slot $l$ to be drawn by means of gravity into said slots, and thus lock the caster. In some cases it may be preferable to dispense with the rod Q and operate the locking mechanism of the truck by means of the foot.

R is an arm, pivoted at $r$ (see Fig. $2^b$) to the base-plate A, having its upper end extending in such position as to be easily reached by the foot. Secured to and forming part of the arm R is a lug S, which extends underneath the arm P in the position shown in Fig. $2^b$. The bolt or pin M is engaged with the slot $l$ of the plates H in locking the casters. In this position the arm P rests upon the end T of lug S. When it is desired to unlock the casters, the arm S is moved in the direction indicated by arrow, and the arm P, by means of the beveled portion U of the lug S, moves up onto the shoulder V of said lug, and in its upward movement, as will be understood, it disengages the bolt or pin M from the slots $l$. It will of course be understood that when the arm is moved in the opposite direction to that just described the bolt or pin M will be released and lock the casters, as before explained.

On reference to Figs. 3 and $3^a$ will be seen an alternative form of means used for locking the casters. W is an arm pivoted in the extensions C. This arm is provided with offsets W' and $W^2$. Secured to the offset $W^2$, which is longer than the said other offset, is a rod X, which is secured to a hand-grip Y, suitably secured to the upper end of one of the handles. Extending between each of the offsets W' and $W^2$ is a pin Z, which extends through the shelf F and has bearing therein. By means of the split pins $z$ the pins Z are prevented from falling out of place. When it is desired to unlock the truck, the rod X is operated in the direction indicated by arrow and the offsets W' and $W^2$ engage with the split pins $z$ of the pins Z, thus raising said pins out of engagement with the slots $l$ in the plates H. As long as it is desired that the said casters revolve it is of course necessary that the said pins Z be held up in the position just described. When it is desired to relock the casters, the hand-grip Y is released, thus permitting the arm W and the pins Z to fall downwardly to the position shown in Figs. 3 and $3^a$. In case the slot $l$ should not be in such position as to be engaged by the pins Z when the same are released the said pins will ride around on the plate H until they register with the slots $l$. When I use the pins $z$, I preferably provide the shelf F with a reinforcement $w$, so as to give the said shelf more increased strength at this particular point.

It will of course be understood that I do not confine myself to locking caster-wheels as applied to only two-wheeled trucks.

It will be noticed in reference to Fig. $3^a$ that the pins Z are formed with the shoulder $z'$, against which the offsets W' and $W^2$ rest. The object of this shoulder $z'$ is to prevent the pins Z being pulled upwardly out of place. Between the split pins $z$ and the offsets W' and $W^2$ there is a certain amount of play, so that the said pins Z can engage at different times with the slot $l$, as will be understood.

What I claim as my invention, and desire to secure by Letters Patent, is—

1. In a truck, in combination with the base-plate, handles secured to same and casters for said base-plate, of a bolt designed to be engaged with said casters to lock same, or disengage from said casters so as to permit same to revolve around their pivotal point, and means for disengaging said bolt from said casters.

2. In a two-wheeled truck, in combination with the base-plate, handles secured to same, and ball-bearing casters, the revolving plate of which is provided with recesses, the said casters being secured to said base-plate, of a bolt, brackets forming part of said base-plate, in which said bolt has vertical movement, the ends of said bolt designed to engage the recesses in the revolving plate of said casters and lock same, and means for disengaging said bolt from the recesses of said casters for unlocking same.

3. In a two-wheeled truck, in combination with the base-plate which is provided with a horizontal shelf, handles secured to said base-plate and ball-bearing casters secured to the horizontal shelf of said base-plate, the revolving plate of said casters being provided with recesses, of a bolt, brackets forming part of said shelf, in which said bolt has vertical movement, the ends of said bolt designed to engage the recesses in the revolving plate of said casters and lock same, an arm pivoted to said base-plate and extending underneath said bolt, and means for operating said arm so as to raise said bolt and disengage same from the recesses of said casters and unlock same.

4. In a two-wheeled truck, in combination with the base-plate which is provided with a horizontal shelf, handles secured to said base-plate and ball-bearing casters secured to the horizontal shelf of said base-plate, the revolving plate of said casters being provided with recesses, of a bolt, brackets forming part of said shelf, in which said bolt has vertical movement, the ends of said bolt designed to engage the recesses in the revolving plate of said casters and lock same, an arm pivoted to said base-plate and extending underneath said bolt and a rod attached to the free end of said arm and extending in proximity to the hand, as and for the purposes specified.

In testimony whereof I have signed my name to this specification in the presence of two subscribing witnesses.

JOHN ARTHUR MARTIN.

Witnesses:
 EGERTON R. CASE,
 P. F. GERRY.